United States Patent
Everard

(10) Patent No.: US 6,213,700 B1
(45) Date of Patent: Apr. 10, 2001

(54) SCREW INSTALLED GROMMET

(75) Inventor: Stephen M. Everard, Eau Claire, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/467,676

(22) Filed: Dec. 21, 1999

(51) Int. Cl.[7] .............................. F16B 13/04; F16B 13/06; F16B 37/04
(52) U.S. Cl. ...................... 411/60.2; 411/80.1; 411/182; 411/508
(58) Field of Search .................... 411/55, 57.1, 60.2, 411/80.1, 80.2, 182, 183, 508, 509

(56) References Cited

U.S. PATENT DOCUMENTS

| | | |
|---|---|---|
| 4,077,300 | 3/1978 | Yoda . |
| 4,082,030 | 4/1978 | Erickson . |
| 4,506,419 | 3/1985 | Mitomi . |
| 4,743,152 * | 5/1988 | Nakayama et al. .................. 411/182 |
| 4,906,152 * | 3/1990 | Kurihara ............................... 411/182 |
| 4,971,500 * | 11/1990 | Benoit et al. ......................... 411/182 |
| 5,269,640 * | 12/1993 | Jonishi et al. .......................... 411/55 |

* cited by examiner

*Primary Examiner*—Neill Wilson
(74) *Attorney, Agent, or Firm*—Pitney, Hardin, Kipp & Szuch LLP

(57) ABSTRACT

The grommet includes a shank with a planar surface through which an aperture is formed. A screw is inserted into the aperture. Boss segments are formed peripherally outwardly adjacent from the aperture. The outer walls of the boss segments form a diameter equal to the diameter of an aperture of a secondary panel to be engaged. The diameter of the screw head does not exceed the diameter of the aperture to be engaged. When the screw is in the fully driven position, the lower chamfered surface of the head of the screw urges the boss segments outwardly so as to engage the secondary panel. The shank of the grommet further includes lateral flexible wings for detent engaging a primary panel with a square aperture.

10 Claims, 3 Drawing Sheets

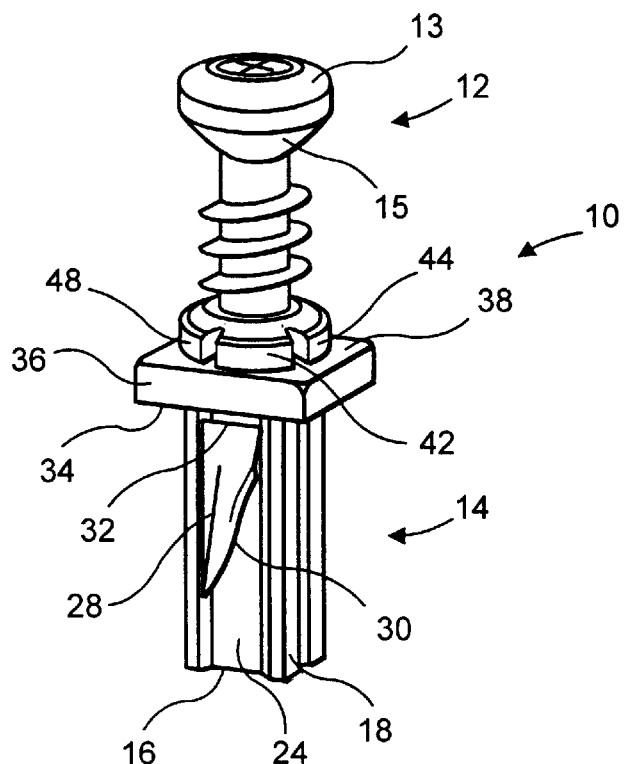
FIG. 1
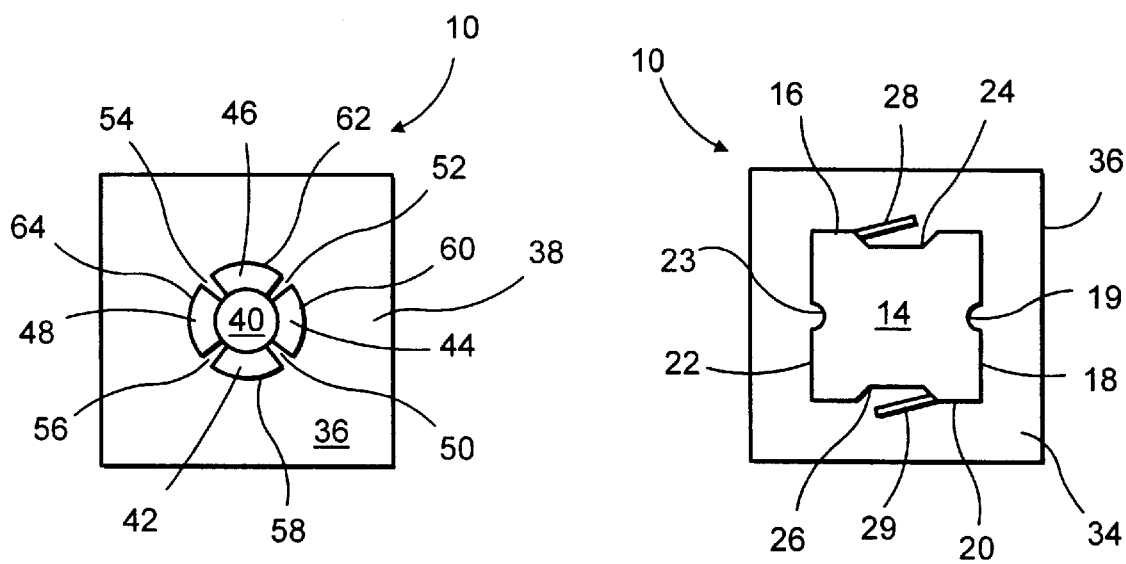
FIG. 3
FIG. 4

SCREW INSTALLED GROMMET

BACKGROUND OF THE INVENTION

1. Field of the Invention

This invention pertains to a grommet wherein the screw can be partially inserted or pre-driven into an aperture with outwardly adjacent peripheral boss segments about the mouth of the aperture which are intended to extend through the aperture of a panel to be engaged. As the screw is fully driven, the chamfer of the screw urges the boss segments outwardly to engage the panel.

2. Description of the Prior Art

In the prior art, grommets can require several steps for installation which can complicate an assembly process. For instance, if the grommet requires that a screw be inserted after the grommet has contacted the panel to be engaged, rather than before such contact, then an extra step is included in the assembly process in that a screw must be picked from stock on the assembly line and inserted into a torque driver. This furthermore adds the screw as an additional part to inventory. While grommets with partially driven screws can be used to engage keyhole slots in the secondary panel, this can be likewise disadvantageous in that a keyhole slot rather than a round aperture is required in the secondary panel and further requires separate forward and downward motions for installation, which is not always possible in confined spaces, such as would be encountered in automotive applications.

Examples of prior art in this field include U.S. Pat. No. 4,506,419 entitled "Part-Fixing Clip" issued on Mar. 26, 1985 to Mitomi; U.S. Pat. No. 4,082,030 entitled "Plastic Screw Grommet" issued on Apr. 4, 1978 to Erickson; and U.S. Pat. No. 4,077,300 issued on Mar. 7, 1978 to Yoda.

OBJECTS AND SUMMARY OF THE INVENTION

It is therefore an object of this invention to provide a grommet which can be used to simplify the assembly process.

It is therefore a further object of this invention to provide a grommet in which the screw can be engaged or pre-driven into the grommet prior to installation of the grommet thereby simplifying the assembly process and eliminating a part from inventory for the automated process.

It is therefore a still further object of this invention to provide a grommet which can be engaged to a panel by a single forward movement.

It is therefore a still further object of this invention to provide a grommet which can engage a secondary panel.

These and other objects are attained by providing a grommet with an aperture and outwardly adjacent peripheral boss segments about the mouth of the aperture. A screw can be pre-driven or partially inserted into the aperture, with the head of screw typically of a diameter typically equally to, or at least not larger than, the diameter defined by the distance between the outer walls of the boss segments. The aperture in the secondary panel to be engaged is intended to be of a diameter substantial equal to the diameter defined by the distance between the outer walls of the boss segments. Therefore, the head of the pre-driven screw can be inserted by a single forward motion through the aperture in the secondary panel thereby inserting the boss segments through the aperture in the secondary panel. The screw is then fully inserted into the aperture of the grommet so that the chamfer of the screw head forces the boss segments outwardly thereby engaging the secondary panel.

BRIEF DESCRIPTION OF THE DRAWINGS

Further objects and advantages of the invention will become apparent from the following description and claims, and from the accompanying drawings, wherein:

FIG. 1 is a perspective view of the grommet of the present invention, showing the screw in a partially inserted or pre-driven position.

FIG. 3 is a top plan view of the grommet of the present invention, with the screw removed.

FIG. 4 is a bottom plan view of the grommet of the present invention.

DETAILED DESCRIPTION OF THE PREFERRED EMBODIMENT

Figure 5:
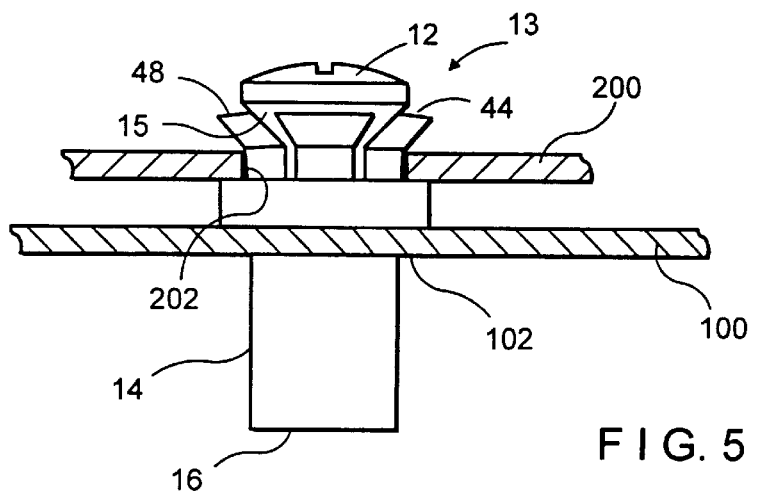
FIG. 5 is a cross-sectional view showing the primary and secondary panels installed on the grommet of the present invention.
Figure 6A:
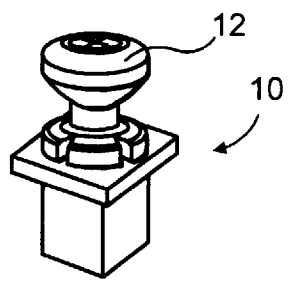
FIGS. 6A–6F are a series of perspective views illustrating the installation of the grommet of the present invention.
Figure 6B:
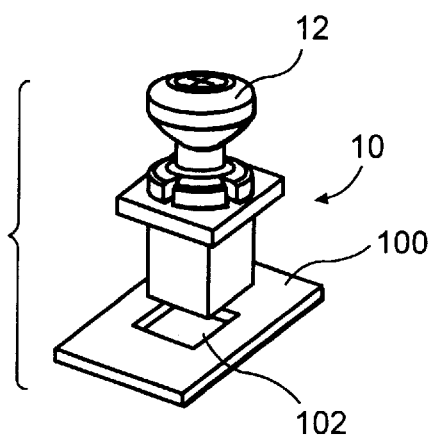
Figure 6C:
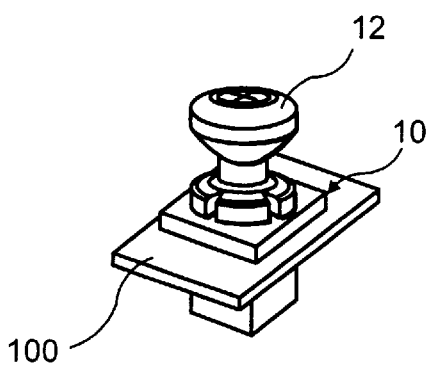
Figure 6D:
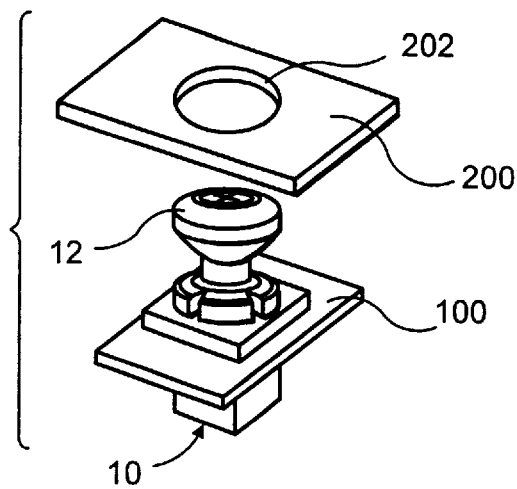
Figure 6E:
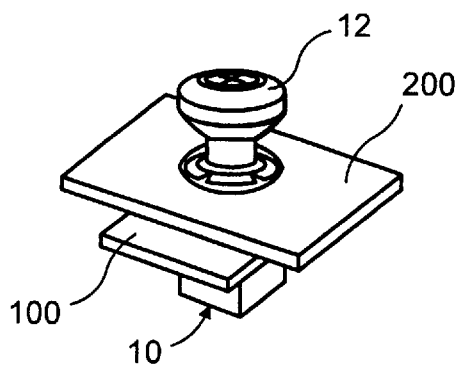
Figure 6F:
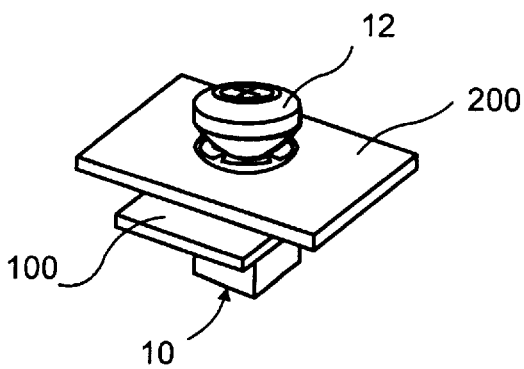

Referring now to the drawings in detail wherein like numerals refer to like elements throughout the several views, one sees that FIG. 1 is a perspective view of grommet 10 with screw 12 in a partially inserted or pre-driven position. Grommet 10 includes shank 14 formed by walls 16, 18, 20, 22 as shown in FIG. 4. Walls 16, 20, however, include broad longitudinal channels 24, 26 over which flexible wing elements 28, 29 extend. Walls 18, 22 likewise include narrow longitudinal channels 19, 23. Alternative structures can be used in lieu of the illustrated flexible wing elements 28, 29 to perform the functions described hereinafter. As shown in FIG. 1, flexible wing element 28 includes downwardly pointing oblique surface 30 for urging wing element 28 toward wall 16 and into broad longitudinal channel 24 as grommet 10 is inserted into a square aperture of primary panel 100 (see FIG. 5). Wing element 28 further includes upper horizontal surface 32 which is parallel to lower surface 34 of planar plate 36. Upper horizontal surface 32 detent engages primary panel 100 against lower surface 34 of planar plate 36 in the installed position as shown in FIG. 5. Flexible wing element 29, of course, has an identical structure.

Figure 2:
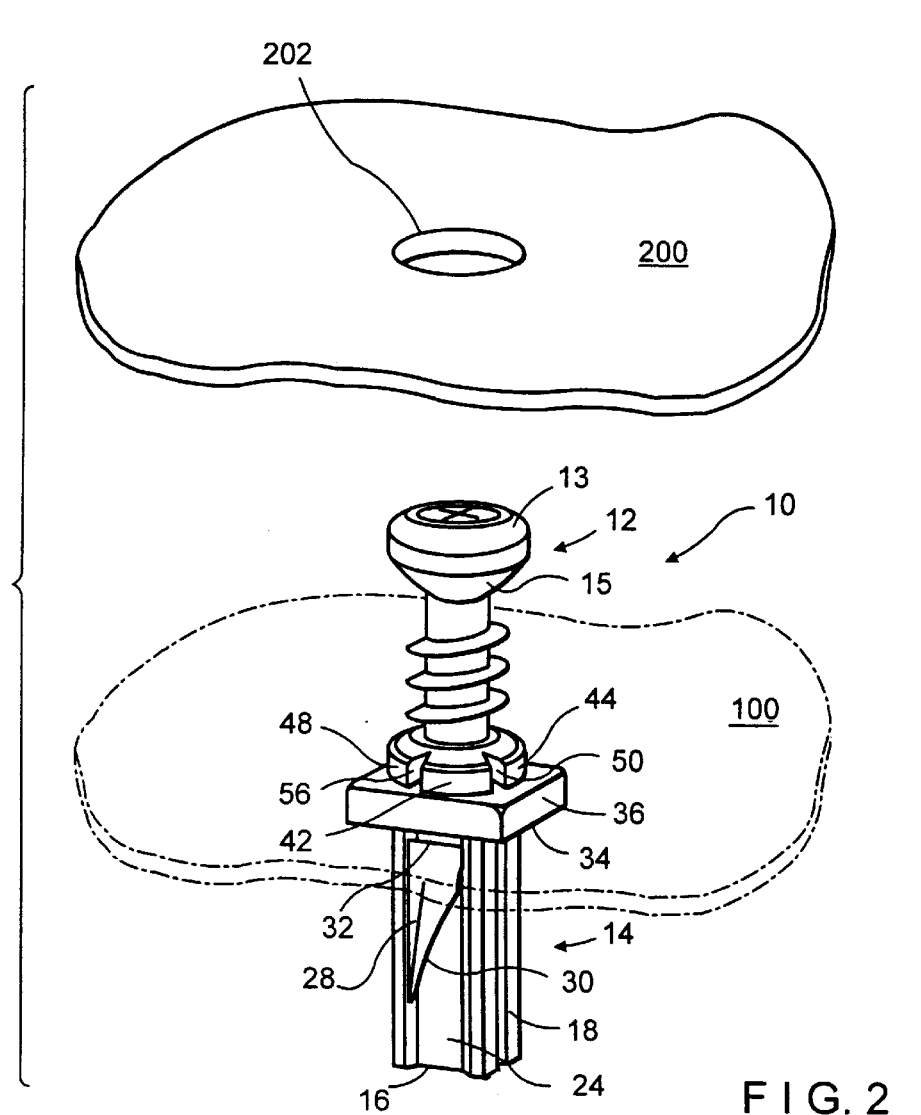
FIG. 2 is a perspective view of the grommet of the present invention, illustrating how the pre-driven screw is inserted through the aperture of the secondary panel.

As shown in FIG. 3, aperture 40 is formed on the center of upper surface 38 of planar plate 36 and extends longitudinally into shank 14. Boss segments 42, 44, 46, 48 are formed peripherally outwardly adjacent from aperture 40 with gaps 50, 52, 54, 56 formed therebetween. Gaps 50, 52, 54, 56 can optionally includes isthmuses between adjacent boss segments which are broken as the boss segments 42, 44, 46, 48 are spread apart or split in the fully driven position shown in FIG. 5. As shown in FIG. 2, the aperture 202 in secondary panel 200 to be engaged has a diameter preferably equal to the diameter formed by the outermost walls 58, 60, 62, 64 of boss segments 42, 44, 46, 48. Likewise, head 13 of screw 12 preferably has a diameter equal to or less than the diameter of aperture 202 (equivalent, equal to or less than the diameter formed by the outermost walls 58, 60, 62, 64 of boss segments 42, 44, 46, 48) so that head 13 of screw 12 can pass through aperture 202.

After boss segments 42, 44, 46, 48 have been inserted through aperture 202, screw 12 is driven into aperture 40 in a conventional manner (i.e., with a screw driver, torque driver, or similar tool) so that the lower chamfered surface 15 of head 13 of screw 12 urges boss segments 42, 44, 46, 48 laterally outward as shown in FIG. 5 to engage secondary panel 200.

To use grommet 10, as shown in the sequence of views of FIGS. 6A–6F, the customer typically receives grommet 10 with partially inserted or pre-driven screw 12 as shown in FIG. 1. The customer or user then typically inserts shank 14 into square aperture 102 of primary panel 100 so that wing elements 28, 29 engage primary panel 100 against lower surface 34 of planar plate 36. The customer or user then inserts boss segments 42, 44, 46, 48 through aperture 202 of secondary panel 200 and, as described above, drives screw 12 into aperture 40 so that boss segments 42, laterally outward to engage secondary panel 200.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A grommet including:
    a shank;
    an aperture in said shank;
    a screw inserted into said aperture, said screw including an enlarged head, said enlarged head having a chamfered surface;
    a boss structure formed peripherally outwardly adjacent from said aperture, said boss structure forming a first diameter when free of contact with said enlarged head, and being urged outwardly by engagement with said chamfered surface to form a second diameter greater than said first diameter.

2. The grommet of claim 1 wherein said boss structure is intended to engage a first panel including an aperture of said first diameter.

3. The grommet of claim 2 wherein said boss structure includes a plurality of boss segments.

4. The grommet of claim 3 wherein said head of said screw has a diameter not greater than a diameter formed by outer walls of said plurality of boss segments.

5. The grommet of claim 4 further including gaps formed between said plurality of boss segments.

6. The grommet of claim 5 wherein said shank further includes lateral flexible wing elements.

7. The grommet of claim 6 further including a plate surface through which said aperture is formed.

8. The grommet of claim 7 wherein edges of said plate surface extend past said shank.

9. The grommet of claim 8 wherein said lateral flexible wing elements include oblique surfaces pointing away from said plate surface for urging said wing elements toward said shank while receiving a second panel and further include a surface generally parallel to said plate surface for detent engaging the second panel therebetween.

10. The grommet of claim 9 wherein walls of said shank include longitudinal channels into which said wing elements can be urged while receiving the second panel.

* * * * *